(12) United States Patent
Mauthe et al.

(10) Patent No.: US 8,065,172 B2
(45) Date of Patent: Nov. 22, 2011

(54) METHOD OF SOURCING ORDERS FOR OPTIMIZED LOGISTICS

(75) Inventors: Christine A. Mauthe, Neenah, WI (US); Christine R. Richards, Neenah, WI (US)

(73) Assignee: Ziti Technologies Limited Liability Company, Dover, DE (US)

( * ) Notice: Subject to any disclaimer, the term of this patent is extended or adjusted under 35 U.S.C. 154(b) by 1719 days.

(21) Appl. No.: 10/746,854

(22) Filed: Dec. 24, 2003

(65) Prior Publication Data

US 2005/0144053 A1    Jun. 30, 2005

(51) Int. Cl.
*G06F 17/30* (2006.01)
(52) U.S. Cl. ..................................................... 705/7.11
(58) Field of Classification Search ............... 705/7, 7.11
See application file for complete search history.

(56) References Cited

U.S. PATENT DOCUMENTS

| | | | |
|---|---|---|---|
| 3,705,410 A | 12/1972 | Kooy et al. | |
| 5,135,344 A | 8/1992 | Kita et al. | |
| 5,161,929 A | 11/1992 | Lichti, Sr. | |
| 5,472,309 A | 12/1995 | Bernard, II et al. | |
| 6,026,378 A | 2/2000 | Onozaki | |
| 6,029,143 A | 2/2000 | Mosher et al. | |
| 6,151,582 A * | 11/2000 | Huang et al. | 705/8 |
| 6,341,266 B1 | 1/2002 | Braun | |
| 6,587,827 B1 | 7/2003 | Hennig et al. | |
| 6,622,127 B1 * | 9/2003 | Klots et al. | 705/28 |
| 6,847,941 B2 | 1/2005 | Ower | |
| 6,876,948 B1 | 4/2005 | Smith | |
| 6,879,962 B1 * | 4/2005 | Smith et al. | 705/22 |
| 6,889,197 B2 * | 5/2005 | Lidow | 705/10 |
| 6,974,928 B2 * | 12/2005 | Bloom | 209/583 |
| 2005/0177440 A1 | 8/2005 | Mathe et al. | |

OTHER PUBLICATIONS

Ghodsypour et al "The total cost of logistics in supplier selection, under conditions of multiple sourcing, multiple criteria and capacity constraint"; Int. J. Production Economics; pp. 15-27.*
Talagrand (Transportation cost for Gaussian and other product measures), Dec. 1996, Geometric and Functional Analysis, pp. 587-600.*
International Search Report and Written Opinion for International Application No. PCT/US2004/024249, mailed Jul. 14, 2006.

* cited by examiner

*Primary Examiner* — Romain Jeanty
(74) *Attorney, Agent, or Firm* — Knobbe Martens Olson & Bear LLP (57) ABSTRACT

The present invention relates a method of sourcing an order. The method adds flexibility to an order sourcing system by readily adjusting the amount of money that must be saved for an order to be reassigned from one source (e.g., a production or distribution center) to another source. The savings value that must be exceeded to reassign the order from one source to another may be set individually for each source and govern where orders can be reassigned. In addition, the savings values for each distribution center may reflect more of the relevant costs that are associated with the products which are used by each distribution center to fill orders. In some forms, the method includes determining all of the costs that are associated with shipping orders to a customer, including orders that require products to be shipped multiple times before reaching a customer.

20 Claims, 6 Drawing Sheets

DETERMINING PROJECTED COSTS ASSOCIATED WITH SHIPPING THE ORDER OF PRODUCTS FROM EACH PRODUCTION CENTER IN A PLURALITY OF PRODUCTION CENTERS TO EACH FINAL DISTRIBUTION CENTER IN A PLURALITY OF FINAL DISTRIBUTION CENTERS, WHEREIN THE PRODUCTS ARE SHIPPED THROUGH AT LEAST ONE INTERMEDIATE DISTRIBUTION CENTER BEFORE REACHING AT LEAST ONE OF THE PLURALITY OF FINAL DISTRIBUTION CENTERS

- THE PRODUCTS GO THROUGH A PLURALITY OF INTERMEDIATE DISTRIBUTION CENTERS BEFORE REACHING THE FIRST FINAL DISTRIBUTION CENTER

- THE PRODUCTS GO THROUGH AT LEAST ONE INTERMEDIATE DISTRIBUTION CENTER BEFORE REACHING THE FIRST FINAL DISTRIBUTION CENTER, AND THE PRODUCTS GO THROUGH A PLURALITY OF INTERMEDIATE DISTRIBUTION CENTERS BEFORE REACHING ANOTHER OF THE FINAL DISTRIBUTION CENTERS

- THE PRODUCTS GO THROUGH AT LEAST ONE INTERMEDIATE DISTRIBUTION CENTER BEFORE REACHING A SECOND FINAL DISTRIBUTION CENTER

- ADDING THE PROJECTED COSTS ASSOCIATED WITH SHIPPING THE ORDER OF PRODUCTS FROM AT LEAST ONE PRODUCTION CENTER TO THE INTERMEDIATE DISTRIBUTION CENTER, TO THE PROJECTED COSTS ASSOCIATED WITH SHIPPING THE ORDER OF PRODUCTS FROM THE INTERMEDIATE DISTRIBUTION CENTER TO AT LEAST ONE FINAL DISTRIBUTION CENTER

44

ASSIGNING THE ORDER TO A FIRST FINAL DISTRIBUTION CENTER BASED ON THE PROJECTED COSTS ASSOCIATED WITH SHIPPING THE PRODUCTS FROM EACH PRODUCTION CENTER TO EACH FINAL DISTRIBUTION CENTER

METHOD OF SOURCING ORDERS FOR OPTIMIZED LOGISTICS

BACKGROUND

Order sourcing methods are used to assign orders for products to one or more sources (e.g., distribution centers, production facilities) that fill the orders by shipping the products to customers. There are some order sourcing methods that automatically assign orders to one or more sources.

One drawback with some existing order sourcing methods is that when an order needs to be reassigned to optimize logistics and/or minimize costs, the order typically may need to be manually reassigned. Most order sourcing methods also usually assign orders to production or shipping facilities based on the geography of the customer's shipping destination relative to the production or distribution centers. The methods often fail to take into consideration the relevant costs that may be involved with shipping products from a particular source.

Some order sourcing methods allow customer orders to be redirected to sources other than the typical geographically determined source in order to reduce costs. In addition, some order sourcing methods permit orders to be reassigned to other sources when there are concerns that the originally assigned source is unable to keep up with the demand for the products in the orders.

Another drawback with some existing order sourcing methods is that orders are often sourced to a production or distribution center that produces, or stores, only a minority of the products that make up the order. When a source produces or stores only a minority of the products that make up the order, the products must be obtained from one or more other sources thereby adding to the cost of filling the order.

Many conventional order sourcing methods often fail to adequately integrate different types of products onto a transport medium (e.g., a truck). As an example, an order for many types of products (or group of products) may be sent to a facility where the order is split up such that one type of product in the order is placed on one truck and another type of product in the product is placed on another truck. The inability of existing systems to adequately integrate different types (or groups) of products onto a transport medium adds unwanted shipping costs when filling orders.

SUMMARY OF THE INVENTION

The purposes and features of the present invention will be set forth in the description that follows. Additional features of the invention will be realized and attained by the product and processes particularly pointed out in the written description and claims hereof, as well as from the appended drawings.

In some forms, the present invention relates to a method of sourcing an order. The method includes assigning the order to a first distribution center that is part of a plurality of distribution centers; determining an adjustable savings value to each distribution center in the plurality of distribution centers; determining whether there is a cost savings associated with reassigning the order to any of the other distribution centers in the plurality of distribution centers; and reassigning the order to a second distribution center as a function of a comparison of the cost savings to the adjustable savings value for the second distribution center.

In another form, the method includes establishing a savings value for each distribution center in a plurality of distribution centers before receiving the order, each savings value reflecting a cost savings that must be incurred for the order to be reassigned from a first distribution center to each of the other distribution centers; receiving the order; assigning the order to the first distribution center; determining whether there is a cost savings associated with reassigning the order to each of the other distribution centers; and reassigning the order to a second distribution center if the cost savings exceeds the savings value that had been previously set for the second distribution center.

In another example form, the present invention relates to a method of sourcing an order of products. The method includes determining projected costs associated with shipping the order of products from each production center in a plurality of production centers to each final distribution center in a plurality of final distribution centers, wherein the products are shipped through at least one intermediate distribution center before reaching at least one of the plurality of final distribution centers; and assigning the order to a first final distribution center based on the projected costs associated with shipping the products from each production center to each final distribution center.

In another form, the method of sourcing an order includes receiving the order; determining what types of products are in the order; analyzing what types of products are shipped from each distribution center in a plurality of distribution centers; and assigning the order to one of the plurality of distribution centers based on the types of products in the order and the types of products that are shipped from each distribution center.

In still another form, the present invention relates to method of sourcing orders. The method includes receiving a first order; assigning the first order to one of a plurality of distribution centers; receiving a second order; determining whether there is a cost savings associated with combining the first order with the second order to form a combined order and then assigning the combined order to any of the plurality of distribution centers; and assigning the combined order to one of the plurality of distribution centers if there is a cost savings.

In another form, the method includes receiving a first order; assigning the first order to one of a plurality of distribution centers; receiving a second order; assigning the second order to one of the plurality of distribution centers; receiving a third order; determining whether there is a cost savings associated with combining the first, second and third orders to form a combined order and then assigning the combined order to any of the plurality of distribution centers; and assigning the combined order to one of the plurality of distribution centers if there is a cost savings.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the invention.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. Like parts depicted in the drawings are referred to by the same reference numerals.

DETAILED DESCRIPTION

In the following detailed description, reference is made to the accompanying drawings, which show specific embodiments in which the invention may be practiced. These embodiments are described in sufficient detail to enable those skilled in the art to practice the invention. It is to be understood that other embodiments may be utilized and structural changes made, such that the following detailed description is not to be taken in a limiting sense.

A method of sourcing an order is described herein. In some forms, the method adds flexibility to an order sourcing system by readily adjusting the amount of money that must be saved for an order to be reassigned from one source (e.g., a production or distribution center) to another source. The savings value that must be exceeded to reassign the order from source to another may be set individually for each source.

The adjustable savings values that are associated with each source govern where orders can be reassigned. As an example, the savings value for a particular distribution center may be set such that it directly, or indirectly, reflects the production costs of the products that are used by the distribution center to fill orders.

In one example scenario, a relatively high savings value could be set for a particular distribution center if there are higher production costs associated with the products that are used by the particular distribution center to fill orders. In another example scenario, a distribution center may be at, or near, capacity such that the savings value for that particular distribution center may be set to at a relatively high level. Setting the savings value at a relatively high level discourages against assigning, or reassigning, an order to the particular distribution center unless there is a large cost savings.

In some forms, the method includes determining all of the costs that are associated with shipping orders to a customer, including orders that require products to be shipped multiple times before reaching a customer. As an example, an order may be shipped from a mill to a first distribution center (e.g., a consolidation center), and then to a second distribution center before being shipped to a customer.

It should be noted that prior art methods only analyze the costs that are associated with the final shipment to the customer when assigning an order to a source. In addition, prior art methods often assign an order to a source that does not normally carry the products which make up an order. The products may be on hand at the source to handle future "combination" orders. Combination orders partially consist of products which are not normally made, or stored, at a source. In one undesirable example, an order for products that are predominately not supplied by a source may be assigned to the source because it appears that the source is the lowest cost alternative to fill the order.

In some forms, the method of the present invention imposes a constraint that an order will not be assigned, or reassigned, to a source unless a certain percentage of items in the order are normally used by the source to fill orders. In an alternative example form, an order may not be assigned, or reassigned, to such a source unless there is a high cost savings.

In some forms of the method, small orders are combined into a single order that is assigned, or reassigned, to one source based on any number of factors (e.g., geography). As an example, the combined order may be reassigned from one source to another source because the new source (i) offers the greatest cost savings; and (ii) exceeds a savings value that is associated with the new source. The cost savings calculations may take into account productions costs, inter-mill and customer freight and storage and handling costs (among other factors).

In some forms, each of the sources where the combined order may be reassigned is ranked by cost savings and/or any particular constraints of the production or distribution centers. One example constraint that may be associated with one or more sources is that a certain percentage of the products which are in the order must be normally be used by a particular source to fill orders.

In one sample form of the method, new orders may be automatically combined with one or more existing orders to create a new order if the existing order(s) have not already been filled. The new combined order may be reassigned to another source as discussed above. In some forms, the new orders will be combined with the existing orders only if the new order and/or the existing orders are below a certain size.

Figure 1:
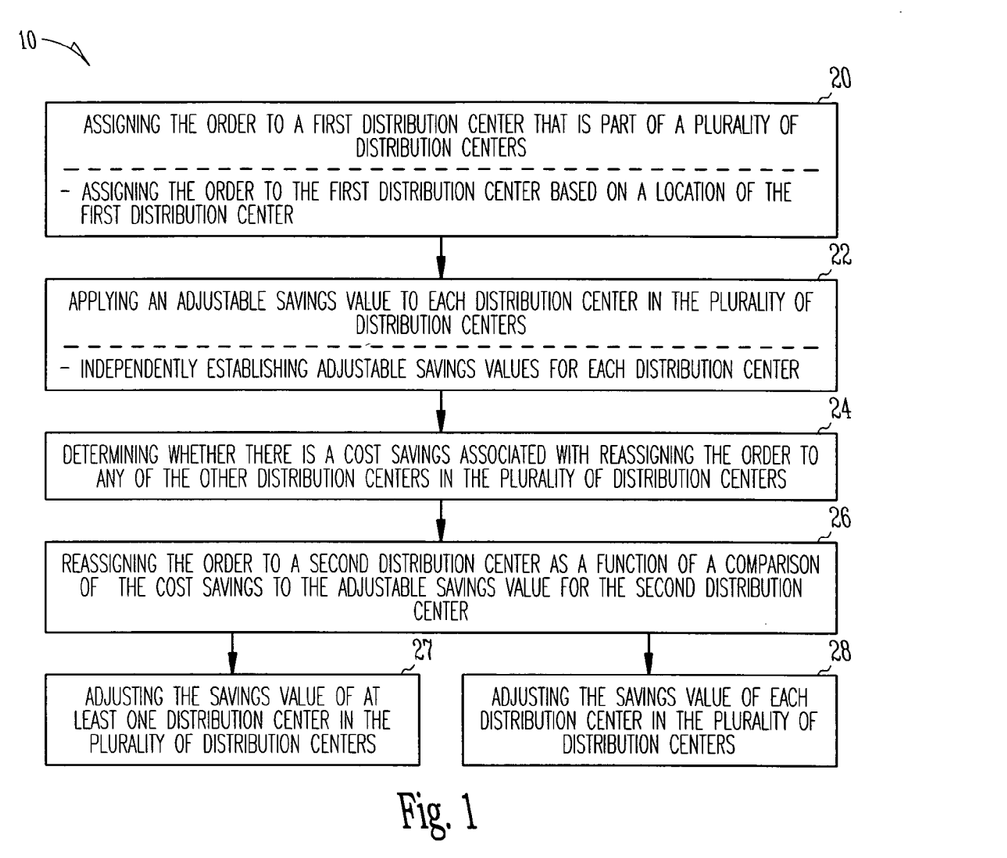
FIG. 1 illustrates a method of sourcing an order.

FIG. 1 illustrates an example method 10 of sourcing an order. The method 10 includes 20 assigning the order to a first distribution center that is part of a plurality of distribution centers and 22 applying an adjustable savings value to each distribution center in the plurality of distribution centers. As used herein, "distribution center" includes all potential sources of products, such as mills, production centers, distribution centers or any other facility that can be used to fabricate, ship and/or store products. The method further includes 24 determining whether there is a cost savings associated with reassigning the order to any of the other distribution centers in the plurality of distribution centers, and 26 reassigning the order to a second distribution center as a function of a comparison of the cost savings to the adjustable savings value for the second distribution center.

As used herein, "order" may include an order for products that is shipped to multiple locations. It should be noted that the products which are used to fill an order may be delivered to a distribution center from any number of sources before an order is shipped to a customer.

In some forms a plurality of products may be arranged into several distinct groups of products based on a variety of factors, such as product demand and product configuration. Arranging products into groups may improve the logistics associated with shipping numerous types of products to multiple customers from multiple sources (e.g., mills, production centers, distribution centers or any other facilities that can be used to fabricate, ship and/or store products).

In some forms, the method may further include 27 adjusting the savings value of at least one distribution center in the plurality of distribution centers, or 28 adjusting the savings value of each distribution center in the plurality of distribution centers. The adjustable savings values allow order sourcing to be more flexible in meeting customer demands.

It should be noted that 20 assigning the order to a first distribution center may include assigning the order to the first distribution center based on a location of the first distribution center. In addition, 22 applying an adjustable savings value to each distribution center may include independently establishing adjustable savings values for each distribution center.

Figure 2:
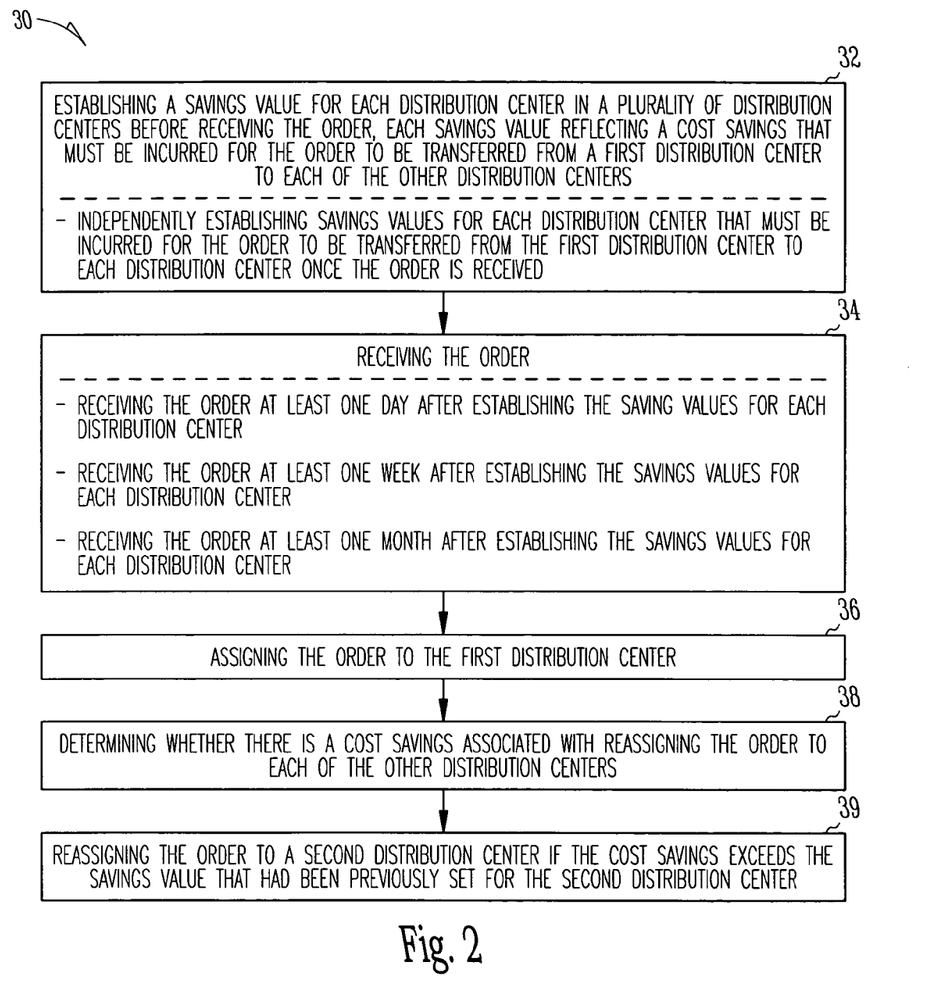
FIG. 2 illustrates another method of sourcing an order.

FIG. 2 illustrates another example method 30 of sourcing an order. The method 30 includes 32 establishing a savings value for each distribution center in a plurality of distribution centers before receiving the order. Each savings values may reflect the cost savings that must be incurred for the order to be reassigned from a first distribution center to each of the other distribution centers. The method further includes 34 receiving the order and 36 assigning the order to the first distribution center. The illustrated example method 30 further includes 38 determining whether there is a cost savings associated with reassigning the order to each of the other distribution centers and 39 reassigning the order to a second distribution center if the cost savings exceeds the savings value that had been previously set for the second distribution center.

It should be noted that 34 receiving the order may include receiving the order at least some time period after establishing the saving values for each distribution center. As examples, the time period may be a day, a week, a month or a year after establishing the saving values for each distribution center.

Establishing a savings value for each source before receiving the order allows the order to be reassigned based on projected future capacity of one or more sources. Therefore, the method can be effectively used to source orders during time periods of historically high demand.

In some forms, 32 establishing a savings value for each distribution center before receiving the order may include independently establishing savings values for each distribution center that must be incurred for the order to be reassigned from the first distribution center to each distribution center once the order is received. In addition, each savings value may be independently adjusted relative to each distribution center in some forms of the method 30.

Figure 3:
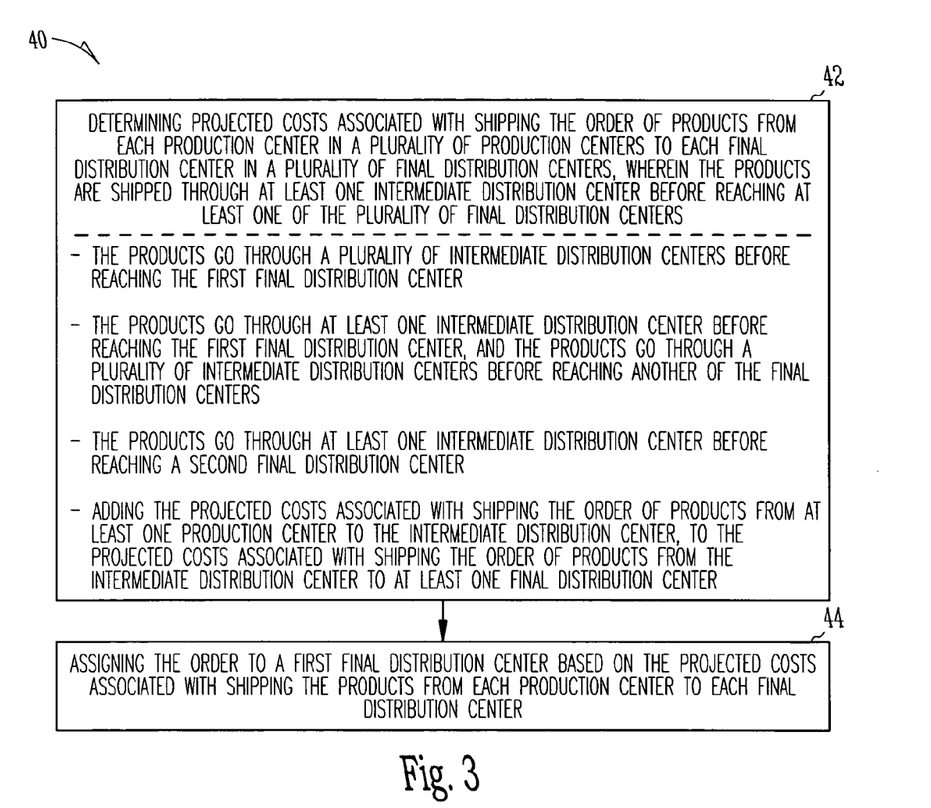
FIG. 3 illustrates yet another method of sourcing an order.

FIG. 3 illustrates another example method 40 of sourcing an order. The method 40 includes 42 determining projected costs associated with shipping the order of products from each production center in a plurality of production centers to each final distribution center in a plurality of final distribution centers. The products are shipped through at least one intermediate distribution center before reaching at least one of the final distribution centers. The method further includes 44 assigning the order to a first final distribution center based on the projected costs associated with shipping the product from each production center to each final distribution center.

As used herein, "production center" includes all potential sources of products where at least a portion of the products are manufactured (i.e., fabricated). Some examples include mills, assembly plants, packaging plants or any other facility that can be used to at least partially fabricate products within an order.

In some forms, the products go through a plurality of intermediate distribution centers before reaching the first final distribution center. In other forms, the products go through at least one intermediate distribution center before reaching each final distribution center. In still another example form, the products go through at least one intermediate distribution center before reaching a first final distribution center, and the products go through a plurality of intermediate distribution centers before reaching a second final distribution center.

It should be noted that 42 determining the projected costs associated with shipping the order of products may include adding the projected costs associated with shipping the order of products from at least one production center to the intermediate distribution center, to the projected costs associated with shipping the order of products from the intermediate distribution center to at least one final distribution center. The method may further include adding the projected costs associated with shipping the order through any other intermediate distribution centers.

The costs that are calculated with the method may include all of the costs (e.g., production, shipping, storage and handling) that are associated with shipping the products at each level until the order is shipped to the customer. Therefore, the method provides a more accurate account of the costs that are associated with filling an order from each source.

Figure 4:
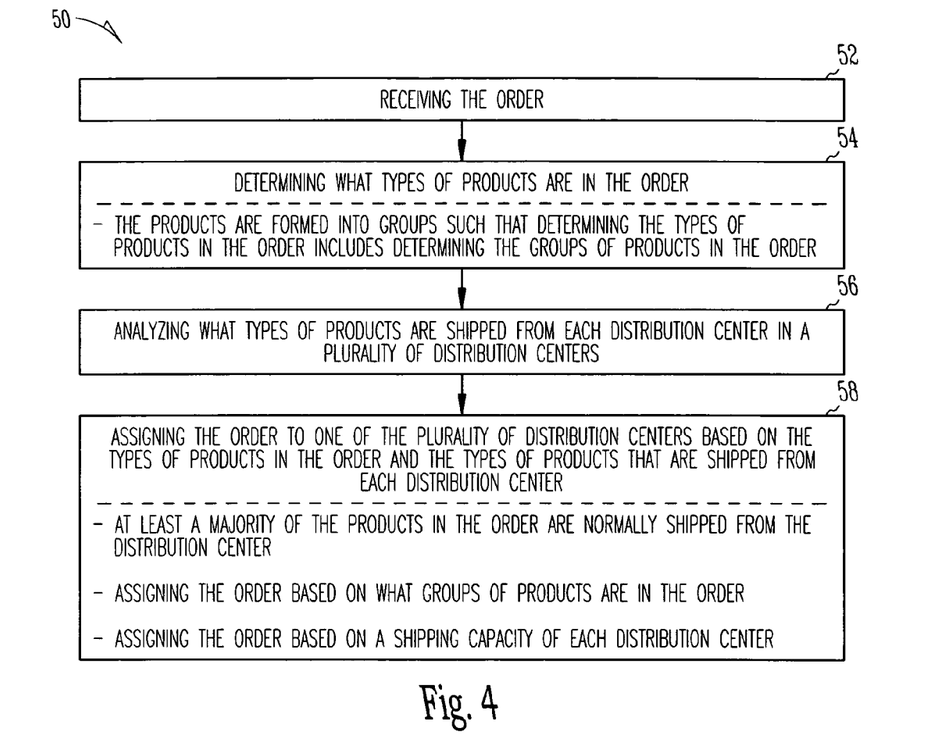
FIG. 4 illustrates still another method of sourcing an order.

FIG. 4 illustrates another example method 50 of sourcing an order. The method 50 includes 52 receiving the order and 54 determining what types of products are in the order. The method further includes 56 analyzing what types of products are shipped from each distribution center in a plurality of distribution centers, and 58 assigning the order to one of the plurality of distribution centers based on the types of products in the order and the types of products that are shipped from each distribution center.

In some forms, at least a majority of the products in the order are normally shipped from the one distribution center. In addition, 58 assigning the order to one of the plurality of distribution centers may include assigning the order based on a shipping capacity of each distribution center.

Assigning the order based on the types of products that are in the order and the types of products that are normally shipped from each distribution center serves to minimize shipping from one source to another in order to fill orders. Minimizing shipping from one source to another in order to fill orders may decrease the costs associated with filling the orders.

It should be noted that the products may be formed into groups such that 54 determining what types of products are in the order may include determining what groups of products are in the order. In addition, 58 assigning the order to one of the plurality of distribution centers may include assigning the order based on what groups of products are in the order.

Figure 5:
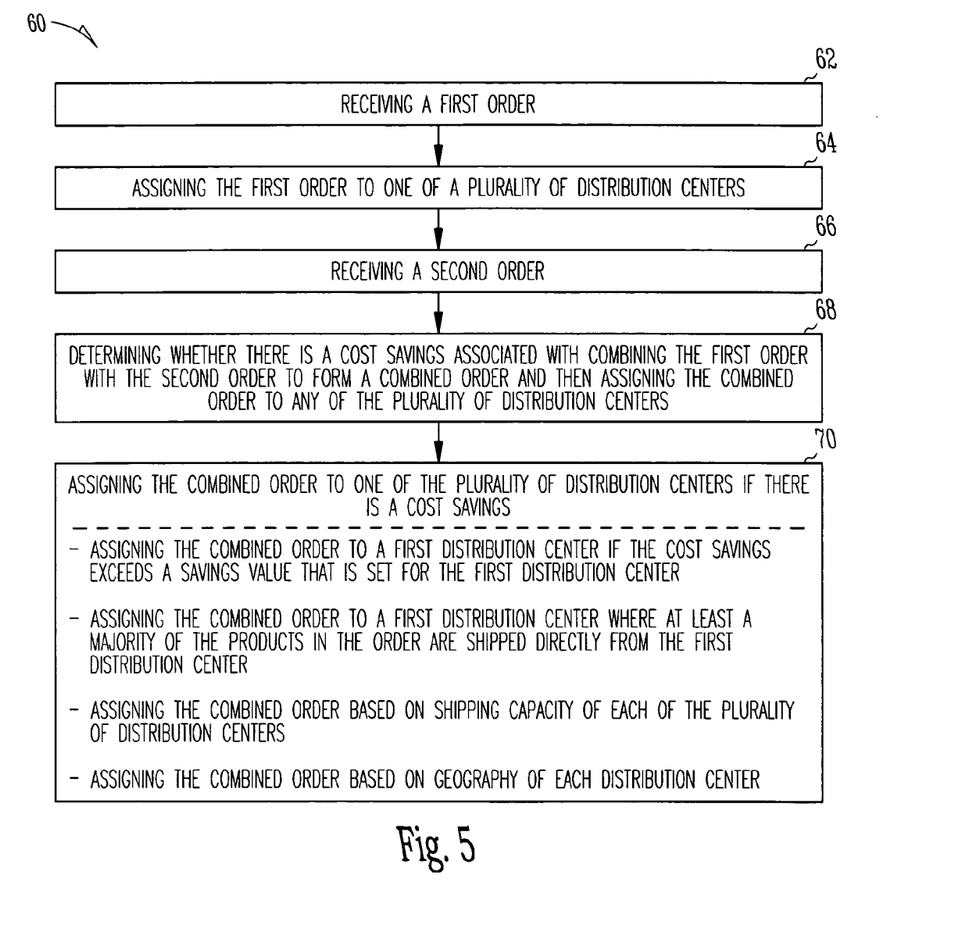
FIG. 5 illustrates another example method of sourcing an order.

FIG. 5 illustrates another example method 60 of sourcing an order. The method 60 includes 62 receiving a first order and 64 assigning the first order to one of a plurality of distribution centers. The method further includes 66 receiving a second order and 68 determining whether there is a cost savings associated with combining the first order with the second order to form a combined order and then assigning the combined order to any of the plurality of distribution centers. The method further includes 70 assigning the combined order to one of the plurality of distribution centers if there is a cost savings.

It should be noted that 70 assigning the combined order to one of the plurality of distribution centers may include (i) assigning the combined order to a first distribution center if the cost savings exceeds a savings value that is set for the first distribution center; (ii) assigning the combined order to a first distribution center where at least a majority (or a certain minimum percentage) of the products in the order are shipped directly from the first distribution center; (iii) assigning the combined order based on shipping capacity of each of the plurality of distribution centers; and/or (iv) assigning the combined order based on geography of each distribution center.

The orders that are combined may be of any size, although in some forms only orders that are below a certain size are combined. Combining small orders may reduce the total overall distribution-related expense that would normally be incurred when filling the orders.

Figure 6:
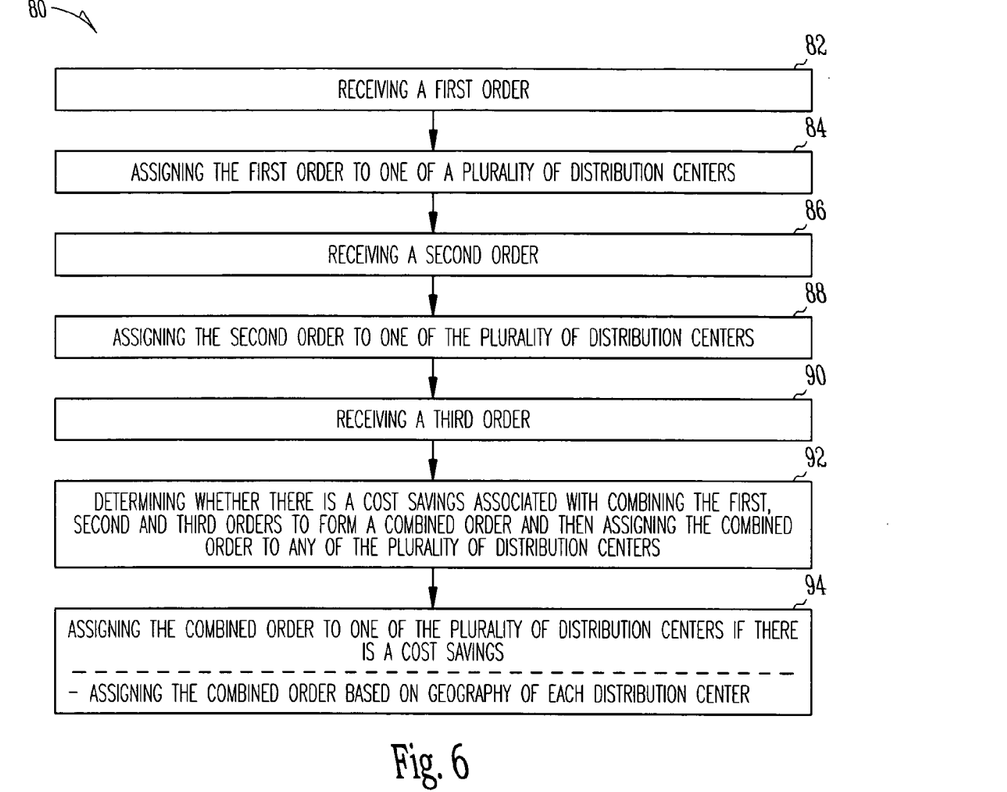
FIG. 6 illustrates still another method of sourcing an order.

FIG. 6 illustrates another example method 80 of sourcing an order. The method 80 includes 82 receiving a first order and 84 assigning the first order to one of a plurality of distribution centers. The method further includes 86 receiving a second order and 88 assigning the second order to one of the plurality of distribution centers. The method further includes 90 receiving a third order and 92 determining whether there is a cost savings associated with combining the first, second and third orders to form a combined order and then assigning the combined order to any of the plurality of distribution centers.

The method further includes 94 assigning the combined order to one of the plurality of distribution centers if there is a cost savings.

In some forms, 94 assigning the combined order to one of the plurality of distribution centers may include assigning the combined order based on geography of each distribution center. As an example, the combined order may be assigned to a distribution center that is in the closest proximity to a customer.

In addition, the combined order may be reassigned to a particular distribution center if the cost savings exceeds a savings value that is set for the particular distribution center. The combined order may also be reassigned to a distribution center where at least a majority (or a certain minimum percentage) of the products in the order are shipped directly from the distribution center.

It should be noted that determining whether there is a cost savings associated with combining the first, second and third orders to form a combined order may include calculating all of the costs (e.g., production, shipping, storage and handling) that are associated with shipping an order to a customer.

The operations discussed above with respect to the described methods may be performed in a different order from those described herein. While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

We claim:

1. A method of sourcing an order, the method comprising:
   assigning the order to a first distribution center that is part of a plurality of distribution centers;
   applying an adjustable savings value to each distribution center in the plurality of distribution centers;
   determining, by one or more computers, whether there is a cost savings associated with reassigning the order to any other distribution centers in the plurality of distribution centers; and
   reassigning the order to a second distribution center as a function of a comparison of the cost savings to the adjustable savings value for the second distribution center.

2. The method of claim 1 wherein assigning the order to a first distribution center includes assigning the order to the first distribution center based on a location of the first distribution center.

3. The method of claim 1 wherein applying an adjustable savings value to each distribution center includes establishing independently-adjustable savings values for each distribution center.

4. The method of claim 1 further comprising adjusting the savings value of at least one distribution center in the plurality of distribution centers.

5. The method of claim 1 further comprising adjusting the savings value of each distribution center in the plurality of distribution centers.

6. A method of sourcing an order, the method comprising:
   establishing a savings value for each distribution center in a plurality of distribution centers before receiving the order, each savings value reflecting a cost savings that must be incurred for the order to be reassigned from a first distribution center to each of the other distribution centers;
   receiving the order;
   assigning the order to the first distribution center;
   determining, by one or more computers, whether there is a cost savings associated with reassigning the order to each of the other distribution centers; and
   reassigning the order to a second distribution center if the cost savings exceeds the savings value that had been previously set for the second distribution center.

7. The method of claim 6 wherein receiving the order includes receiving the order at least one day after establishing the saving values for each distribution center.

8. The method of claim 6 wherein receiving the order includes receiving the order at least one week after establishing the savings values for each distribution center.

9. The method of claim 6 wherein receiving the order includes receiving the order at least one month after establishing the savings values for each distribution center.

10. The method of claim 6 wherein establishing savings values for each distribution center before receiving the order includes establishing independent savings values for each distribution center that must be incurred for the order to be reassigned from the first distribution center to each distribution center once the order is received.

11. A method of sourcing orders, the method comprising:
    receiving a first order;
    assigning the first order to one of a plurality of distribution centers;
    receiving a second order;
    determining, by one or more computers, whether there is a cost savings associated with combining the first order with the second order to form a combined order and then assigning the combined order to any of the plurality of distribution centers; and
    assigning the combined order to one of the plurality of distribution centers if there is a cost savings, wherein assigning the combined order to one of the plurality of distribution centers includes assigning the combined order to a first distribution center if the cost savings exceeds a savings value that is set for the first distribution center.

12. The method of claim 11 wherein assigning the combined order to one of the plurality of distribution centers includes assigning the combined order to a first distribution center where at least a majority of the products in the order are shipped directly from the first distribution center.

13. The method of claim 11 wherein assigning the combined order to one of the plurality of distribution centers includes assigning the combined order based on shipping capacity of each of the plurality of distribution centers.

14. The method of claim 11 wherein assigning the combined order to one of the plurality of distribution centers includes assigning the combined order based on geography of each distribution center.

15. A system comprising:
    an order sourcing system comprising one or more computing devices, the order sourcing system configured to:
    assign the order to a first distribution center that is part of a plurality of distribution centers;
    apply an adjustable savings value to each distribution center in the plurality of distribution centers;
    determine whether there is a cost savings associated with reassigning the order to any other distribution centers in the plurality of distribution centers; and
    reassign the order to a second distribution center as a function of a comparison of the cost savings to the adjustable savings value for the second distribution center.

16. The system of claim 15, further comprising adjusting the savings value of at least one distribution center in the plurality of distribution centers.

17. The system of claim 15, further comprising adjusting the savings value of each distribution center in the plurality of distribution centers.

18. A system comprising:
an order sourcing system comprising one or more computing devices, the order sourcing system configured to:
establish a savings value for each distribution center in a plurality of distribution centers before receiving the order, each savings value reflecting a cost savings that must be incurred for the order to be reassigned from a first distribution center to each of the other distribution centers;
receive the order;
assign the order to the first distribution center;
determine whether there is a cost savings associated with reassigning the order to each of the other distribution centers; and
reassign the order to a second distribution center if the cost savings exceeds the savings value that had been previously set for the second distribution center.

19. The system of claim 18, wherein receiving the order includes receiving the order at least one day after establishing the saving values for each distribution center.

20. The system of claim 18, wherein receiving the order includes receiving the order at least one month after establishing the savings values for each distribution center.

* * * * *

UNITED STATES PATENT AND TRADEMARK OFFICE
CERTIFICATE OF CORRECTION

PATENT NO. : 8,065,172 B2  Page 1 of 1
APPLICATION NO. : 10/746854
DATED : November 22, 2011
INVENTOR(S) : Mauthe et al.

It is certified that error appears in the above-identified patent and that said Letters Patent is hereby corrected as shown below:

Column 8, line 44, in Claim 12, delete "of the products" and insert -- of products --.

Signed and Sealed this
Twelfth Day of June, 2012

David J. Kappos
*Director of the United States Patent and Trademark Office*